(12) United States Patent
Sato et al.

(10) Patent No.: US 11,961,182 B2
(45) Date of Patent: Apr. 16, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takatoshi Sato, Kanagawa (JP); Makoto Tomioka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/687,375

(22) Filed: Mar. 4, 2022

(65) Prior Publication Data

US 2023/0326131 A1    Oct. 12, 2023

(30) Foreign Application Priority Data

Mar. 9, 2021 (JP) ................................. 2021-037805
Jan. 18, 2022 (JP) ................................. 2022-005838

(51) Int. Cl.
*G06T 17/05* (2011.01)
*G06T 5/50* (2006.01)
*G06T 7/73* (2017.01)

(52) U.S. Cl.
CPC ................ *G06T 17/05* (2013.01); *G06T 5/50* (2013.01); *G06T 7/75* (2017.01)

(58) Field of Classification Search
CPC .............. G06T 5/50; G06T 7/75; G06T 17/05
See application file for complete search history.

(56) References Cited

U.S. PATENT DOCUMENTS

| | | | |
|---|---|---|---|
| 9,286,810 B2 | 3/2016 | Eade et al. | |
| 9,910,444 B2 | 3/2018 | Eade et al. | |
| 2012/0121161 A1 | 5/2012 | Eade et al. | |
| 2016/0147230 A1* | 5/2016 | Munich | G05D 1/0246 |
| | | | 701/28 |
| 2016/0154408 A1 | 6/2016 | Eade et al. | |
| 2021/0095992 A1* | 4/2021 | Kitaura | G06T 7/579 |

FOREIGN PATENT DOCUMENTS

JP            2014222550 A      11/2014

* cited by examiner

*Primary Examiner* — Kee M Tung
*Assistant Examiner* — Jed-Justin Imperial
(74) *Attorney, Agent, or Firm* — Canon U.S.A., Inc. IP Division

(57) ABSTRACT

An information processing apparatus generates a map element that is based on a position and orientation of an image capturing apparatus and three-dimensional position information about a feature point included in an image, generates three-dimensional map information based on a plurality of map elements at a plurality of different positions and orientations, corrects, in such a way as to make smaller a reprojection error of a common feature point in a first map element group, at least one of a position and orientation of the image capturing apparatus and the three-dimensional position included in the first map element group, and corrects, in such a way as to make smaller a reprojection error of the common feature point with use of a second map element group, at least one of a position and orientation of the image capturing apparatus and the three-dimensional position information included in the second map element group.

18 Claims, 7 Drawing Sheets

INFORMATION PROCESSING APPARATUS, INFORMATION PROCESSING METHOD, AND STORAGE MEDIUM

BACKGROUND

Field of the Disclosure

Aspects of the present disclosure generally relate to a technique to generate three-dimensional map information about an environment in which a moving body moves.

Description of the Related Art

Estimation of the position and orientation of an image capturing apparatus that is based on image information is used for various purposes, such as positional matching between a real space and a virtual object in an apparatus for realizing mixed reality or augmented reality, self-location estimation of a robot or an automobile, and three-dimensional modeling of an object or space. Position and orientation estimation is performed with use of image features detected from image information and a three-dimensional map of an environment in which three-dimensional position information about image features calculated therefrom is used as a map element.

Three-dimensional position information about an image feature included in a map element may contain errors. Therefore, Japanese Patent Application Laid-Open No. 2014-222550 discusses a technique to correct a three-dimensional position of an image feature included in a three-dimensional map of an environment in such a manner that a two-dimensional position obtained by projecting, on an image, three-dimensional position information included in the three-dimensional map of the environment and a two-dimensional position of an image feature detected on the image geometrically match each other.

The technique discussed in Japanese Patent Application Laid-Open No. 2014-222550 sets only a predetermined number of map elements as correction targets so as to perform map correction within a predetermined time. However, depending on the number of map elements targeted for correction, there is a limit to improving the geometric accuracy of a map. Moreover, the reliability of three-dimensional position information in an environment of an image feature may have variations depending on map elements.

SUMMARY

Aspects of the present disclosure are generally directed to correcting, with a high degree of accuracy, a map in an environment in which a moving body moves.

According to an aspect of some embodiments, an information processing apparatus includes a first generation unit configured to generate a map element that is based on a position and orientation of an image capturing apparatus estimated from an image obtained by performing image capturing of an environment with the image capturing apparatus being mounted on a moving body and three-dimensional position information in the environment about a feature point included in the image, a second generation unit configured to generate three-dimensional map information based on a plurality of map elements, each corresponding to the map element, generated from images having a difference in point of view captured by the image capturing apparatus at a plurality of different positions and orientations, a first correction unit configured to, in such a way as to make smaller a reprojection error of a common feature point included in common in a first map element group out of the three-dimensional map information, correct at least one of a position and orientation of the image capturing apparatus and three-dimensional position information about the feature point included in the first map element group, and a second correction unit configured to, in such a way as to make smaller a reprojection error of the common feature point with use of a second map element group in which a wider difference in point of view is obtained than in the first map element group with respect to the common feature point in a case where a difference in point of view of images including the common feature point is less than or equal to a predetermined value, correct at least one of a position and orientation of the image capturing apparatus and three-dimensional position information about the feature point included in the second map element group.

Further features of various embodiments will become apparent from the following description of exemplary embodiments with reference to the attached drawings.

DESCRIPTION OF THE EMBODIMENTS

Figure 1A:
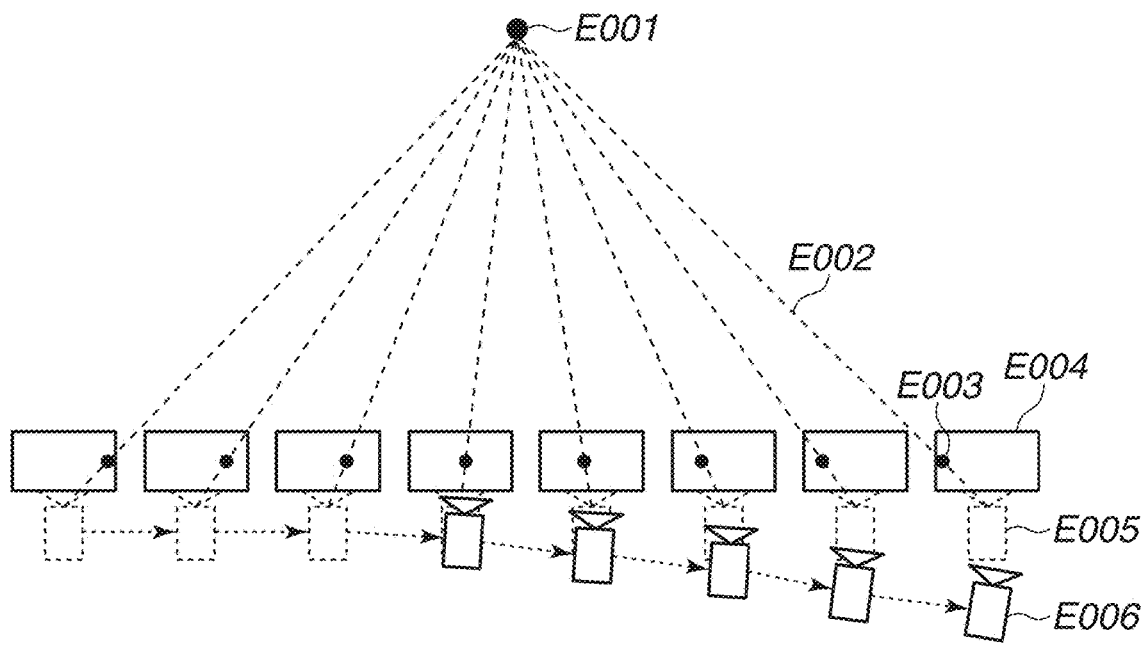
FIGS. 1A, 1B, and 1C are diagrams illustrating a concept of processing in a first exemplary embodiment.

Various exemplary embodiments, features, and aspects will be described in detail below with reference to the drawings. Furthermore, the following exemplary embodiments are not intended to limit the claims. While, in the exemplary embodiments, a plurality of characteristics is described, not all of the plurality of characteristics is necessarily essential for every embodiment, and, moreover, some of the plurality of characteristics can be optionally combined. Additionally, in the accompanying drawings, the respective same or similar components are assigned the respective same reference characters, and any duplicate description thereof is omitted.

A first exemplary embodiment is directed to an information processing apparatus which implements what is called simultaneous localization and mapping (SLAM) for generating or correcting three-dimensional map information while performing matching between a feature point obtained from an image input from a camera, which is an image capturing apparatus, and a feature point obtained from a map element of three-dimensional map information and calculating a position and orientation of the camera. For example, the calculated position and orientation is used to control a moving body. The moving body is, for example, an autonomous mobile robot (AMR), an automatic guided vehicle (AGV), an autonomous vehicle (AV), a robotic vacuum cleaner, and a drone. While, in the first exemplary embodiment, an example in which the information processing apparatus is mounted on the moving body is described, the information processing apparatus can be provided on a server connected to the moving body via a network.

<Operation Overview>

If, when correcting three-dimensional map information generated with use of an image captured by a camera, the information processing apparatus attaches importance to high-speed performance and tries to complete correction processing within a predetermined time, the number of map elements able to be targeted for correction is previously determined to be a fixed number. Usually, the information processing apparatus performs correction processing within a narrow range with use of the previously determined fixed number of map elements. In the first exemplary embodiment, a method of correcting a map with a high degree of accuracy even in a case where it is supposed that, even if correction is performed within a narrow range with use of the previously determined fixed number of map elements, correction is not able to be performed with an expected degree of accuracy is described. The information processing apparatus selects a subset of map elements obtained by adaptively broadening a correction range (i.e., the number of map elements targeted for correction) and then performs correction processing of a map with the selected subset set as a target. Moreover, in the following exemplary embodiments, the information processing apparatus is assumed to correct a three-dimensional map in which an image feature included in an image captured by the camera, a position and orientation of the camera obtained at the time of capturing of the image, and a three-dimensional position of the image feature calculated from the image feature and the position and orientation are set as map elements.

In a case where image capturing of an environment in which a far landscape is mainly contained in an image and a short-range image feature is unlikely to be obtained is performed by the camera, even if the camera moves, a difference in point of view in the image (called motion parallax) is unlikely to be obtained. An insufficient difference in point of view means that the reliability of a three-dimensional position of a three-dimensionally measured image feature is low. Therefore, if the information processing apparatus selects map elements in a narrow range determined with importance attached to a high-speed performance and then performs correction processing of a map, a variance of positions and orientations of the camera or three-dimensional positions of the image feature, which are included in three-dimensional map information, increases. In such a case, the information processing apparatus is able to increase the accuracy of a map by setting map elements in a broader region as a map correction target in such a way as to make motion parallax larger. In the first exemplary embodiment, the information processing apparatus corrects a map with a high degree of accuracy by selecting map elements in a broader range in such a manner that the maximum value of a difference in point of view on an image included in a map element group targeted for correction becomes greater than or equal to a predetermined value. Selecting map elements in a broader range means making the number of map elements targeted for correction larger than a previously determined fixed number. The map elements targeted for correction are part of three-dimensional map information.

Figure 1B:
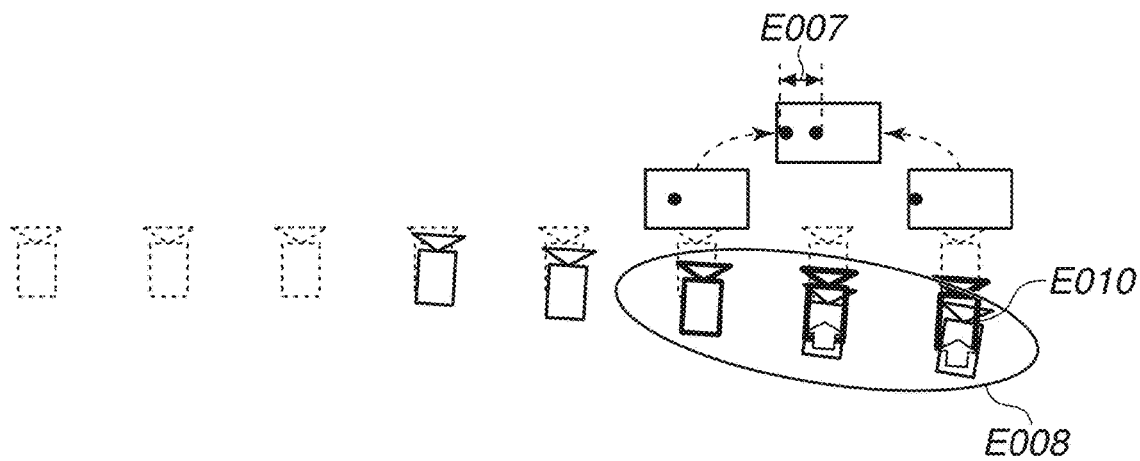
Figure 1C:
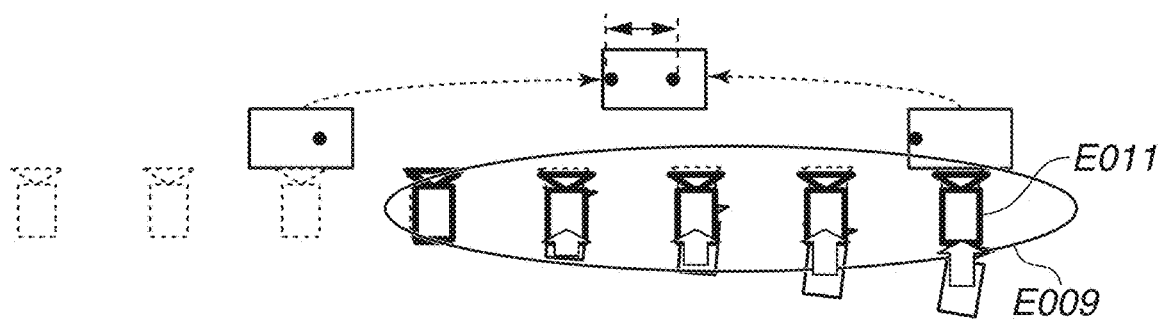

FIGS. 1A, 1B, and 1C are diagrams used to explain a concept of processing in the first exemplary embodiment. This conceptual diagram illustrates an example of a case where the camera is moving from left to right (actually, a moving body with the camera mounted thereon is moving). Trajectory E005 represents a locus of the real camera position and orientation. Trajectory E006 represents a locus of the measured camera position and orientation. In position measurement using images, due to accumulation of measuring errors, the measured camera position and orientation (E006) is gradually moving away from the real camera position and orientation (E005). Therefore, the information processing apparatus corrects three-dimensional map information with use of an image sequence which the camera has obtained while moving. Specifically, the information processing apparatus detects an image feature (E003) from an image group (E004) captured by the camera. Then, the information processing apparatus minimizes a distance between the position of a projection point on an image obtained by projecting (E002) a three-dimensional position (E001) of the image feature on the image group (E004) based on the camera position and orientation (E006) and the position of the detected image feature. In this way, the information processing apparatus minimizes a reprojection error, thus correcting a three-dimensional position of the image feature serving as a map element and a camera position and orientation taken at the time of acquisition of the image feature. A relationship between correcting a camera position and orientation and a three-dimensional position of the image feature and correcting three-dimensional map information is described below.

Since correction of the position and orientation requires large calculation cost, the technique discussed in Japanese Patent Application Laid-Open No. 2014-222550 limits the number of map elements targeted for correction so as to reduce calculation cost for high-speed processing, so that the correction range is made narrow. However, in a case where a difference in point of view of an image feature included in a predetermined narrow correction range is insufficient, such as a case where an image feature is located far as viewed from the camera, there is a limit to increasing the accuracy of calculation of the camera position and orientation.

An insufficiency in a difference in point of view results in the reliability of a three-dimensional position of the three-dimensionally measured image feature decreasing. In the first exemplary embodiment, the information processing apparatus increases or decreases the number of map elements targeted for error correction processing based on the largeness or smallness of an error E007 in point of view of image features captured by the camera at a plurality of time points. For example, in a case where the difference in point of view is smaller than a predetermined value, the information processing apparatus selects map elements in an error correction range (E009) broader than a correction range (E008) determined from the previously defined number of map elements, thus making the corrected camera position and orientation (E010) into a high-accuracy position and orientation (E011). In the example illustrated in FIG. 1B, the information processing apparatus performs correction in a narrow correction range (E008), so that the measured camera position and orientation (E006) is corrected into a position and orientation (E010), which is insufficient in correction. In the example illustrated in FIG. 1C, the information processing apparatus performs correction in a wide correction range (E009) which has been set in consideration of a difference in point of view, so that the measured camera position and orientation (E006) is corrected into a position and orientation (E011). The camera position and orientation (E011) is closer to the real position and orientation (E005) than the position and orientation (E010).

In the first exemplary embodiment, correction of a map means local bundle adjustment of a keyframe and a three-dimensional position of an image feature. The keyframe means a map element in which an image feature position of the image captured by the camera is associated with the position and orientation of the camera. The bundle adjustment means processing for correcting the camera position and orientation and the three-dimensional position of an image feature in such a way as to minimize a difference between the position of a projection point obtained by projecting the three-dimensional position of the image feature on the keyframe and the position of an image feature point detected from the image. Moreover, selecting a previously defined number of keyframes to perform map correction is the local bundle adjustment. With regard to such a keyframe, bundle adjustment, and local bundle adjustment, there is a detailed description in Raul Mur-Artal et al., ORB-SLAM: A Versatile and Accurate Monocular SLAM System, IEEE Transactions on Robotics (hereinafter referred to as a "method by Raul et al.").

<Apparatus Configuration>

Figure 2:
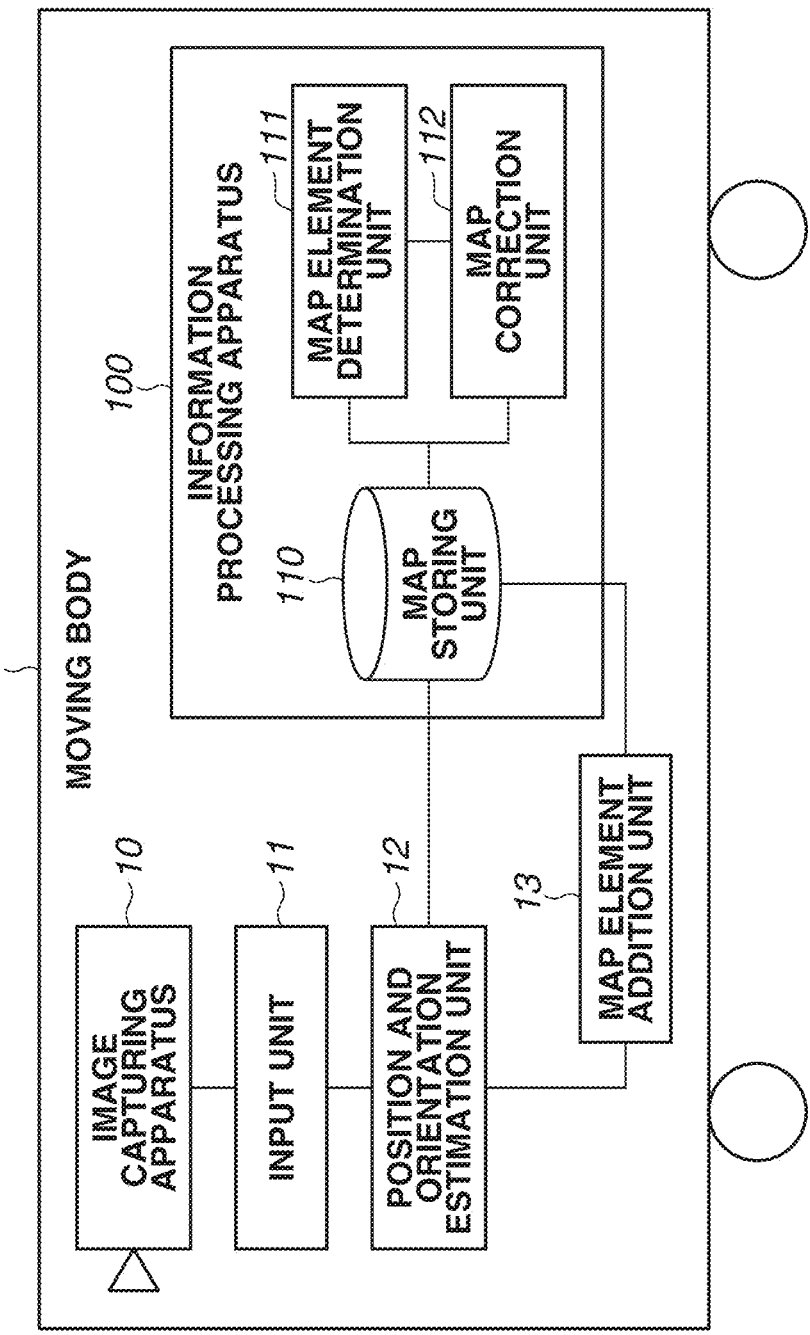
FIG. 2 is a diagram used to explain a configuration of an information processing apparatus in the first exemplary embodiment.

FIG. 2 is a diagram illustrating a functional configuration of an information processing apparatus 100 according to the first exemplary embodiment. As mentioned above, the information processing apparatus 100 calculates a position and orientation of a camera, which is an image capturing apparatus 10, based on an image input from the camera, and outputs the calculated position and orientation to a moving body control unit (not illustrated) to control a moving body 1. For example, a stereoscopic camera is used as the image capturing apparatus 10 to acquire a three-dimensional position of an image feature point.

An input unit 11, which is connected to the camera serving as the image capturing apparatus 10, receives, as an input, an image captured by the camera in a time-series manner (for example, at 60 frames per second) and outputs the captured image to a position and orientation estimation unit 12. Here, the image capturing apparatus 10 acquires, for example, a monochrome image. Naturally, the image capturing apparatus 10 can acquire a color image.

The position and orientation estimation unit 12 acquires three-dimensional map information from a map storing unit 110, and performs matching between an image feature detected from an image input from the input unit 11 and an image feature included in the three-dimensional map information. The position and orientation estimation unit 12 calculates a position and orientation of the image capturing apparatus 10 based on a result of the matching. The calculated position and orientation is output to a control unit (not illustrated). The position and orientation estimation unit 12 can be configured to be included in the information processing apparatus 100.

A map element addition unit 13 receives, as an input, the position and orientation of the camera calculated by the position and orientation estimation unit 12, and performs addition determination of a map element, i.e., a keyframe. If determining that map addition is necessary, the map element addition unit 13 generates a new keyframe and inputs the generated keyframe to the map storing unit 110. The map element addition unit 13 can be configured to be included in the information processing apparatus 100.

The map storing unit 110 stores three-dimensional map information. The map storing unit 110 can be provided on an external server. The data structure of the three-dimensional map information is described below. The map storing unit 110 outputs, as needed, the stored three-dimensional map information or map elements included in the three-dimensional map information to the position and orientation estimation unit 12 and a map element determination unit 111. Moreover, the map storing unit 110 receives, as an input, and stores a map element added by the map element addition unit 13 and a map element input by a map correction unit 112.

The map element determination unit 111 determines a map element which the map correction unit 112 corrects. The map element determination unit 111 outputs the determined map element to the map correction unit 112.

The map correction unit 112 corrects a map element input by the map element determination unit 111. The map correction unit 112 outputs a result of correction to the map storing unit 110, so that the map storing unit 110 stores the received result.

Three-dimensional environmental map information is data storing, as map elements (keyframes), image feature information detected from an image, position and orientation information about a camera which captured an image in which an image feature was detected (hereinafter also referred to as a "position and orientation of the image"), and three-dimensional position information about an image feature.

The image feature information means a feature amount of each image feature, i.e., two-dimensional coordinates (u, v) on an image.

The image feature is detected as a feature point representing a place which is large in luminance gradient change, such as an edge or corner, in an image. The position and orientation information means six parameters obtained by adding together three parameters representing the position of the camera in a world coordinate system defined in a real space and three parameters representing the orientation of the camera. Furthermore, six parameters of rotation can be sometimes represented by three rows×three columns as a rotation matrix. The rotation representation is omitted from description because there is a known method of interconversion. Moreover, the three-dimensional position information about an image feature (hereinafter also referred to as a "feature point") means three-dimensional coordinates (X, Y, Z) on the world coordinate system.

In the first exemplary embodiment, an image feature and a position and orientation of the image in which the image feature has been detected are stored in combination as a keyframe. The above-mentioned selection of a map element means selecting a keyframe.

A position and orientation of the camera is calculated by performing matching between an image feature included in a keyframe and an image feature detected from an image and minimizing a deviation in a geometric correspondence relationship. The image feature to be used is an Oriented FAST and rotated BRIEF (ORB) feature amount, which stores a local pattern as a binary feature (hereinafter, an image feature being referred to as a "feature point"). A position and orientation of the image capturing apparatus 10 is calculated by solving a Perspective-n-Point (PNP) problem from a correspondence relationship between three-dimensional coordinates of a feature point of the keyframe and two-dimensional coordinates of a feature point in the image, which have matched each other. The method by Raul et al. includes details of such a calculation.

Figure 3:
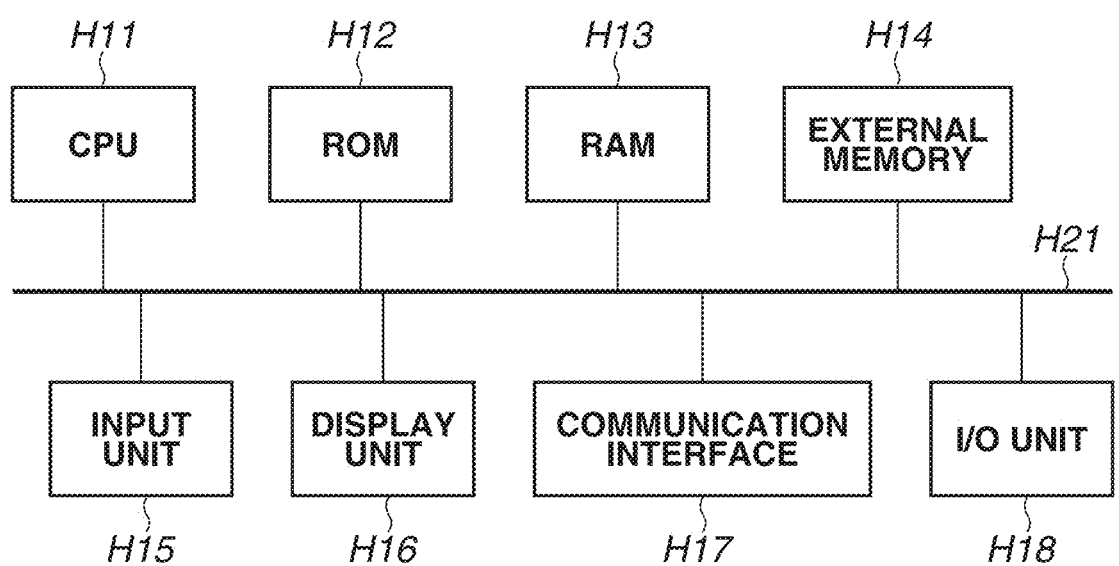
FIG. 3 is a diagram illustrating a hardware configuration of the information processing apparatus in the first exemplary embodiment.

FIG. 3 is a diagram illustrating a hardware configuration of the information processing apparatus 100. A central processing unit (CPU) H11 performs control of various devices connected to a system bus H21. A read-only memory (ROM) H12 stores a program of the Basic Input/Output System (BIOS) and a boot program. A random access memory (RAM) H13 is used as a main storage device for the CPU H11. An external memory H14 stores programs which the information processing apparatus 100 processes. An input unit H15 performs processing concerning inputting of, for example, information from, for example, a keyboard and a mouse. A display unit H16 displays, on a display device, a result of calculation obtained from the information processing apparatus 100 according to an instruction from the CPU H11. Furthermore, the display device can be any type of display device, such as a liquid crystal display device, a projector, or a light-emitting diode (LED) indicator. A communication interface H17 performs information communication via a network, and the communication method thereof can be Ethernet or can be any type of method, such as Universal Serial Bus (USB), serial communication, or wireless communication. Furthermore, with respect to a control unit of the moving body (not illustrated), the information processing apparatus 100 performs exchange of calculated position and orientation information via the communication interface H17. An input-output (I/O) unit H18 receives an image as an input from the image capturing apparatus 10.

Figure 4:
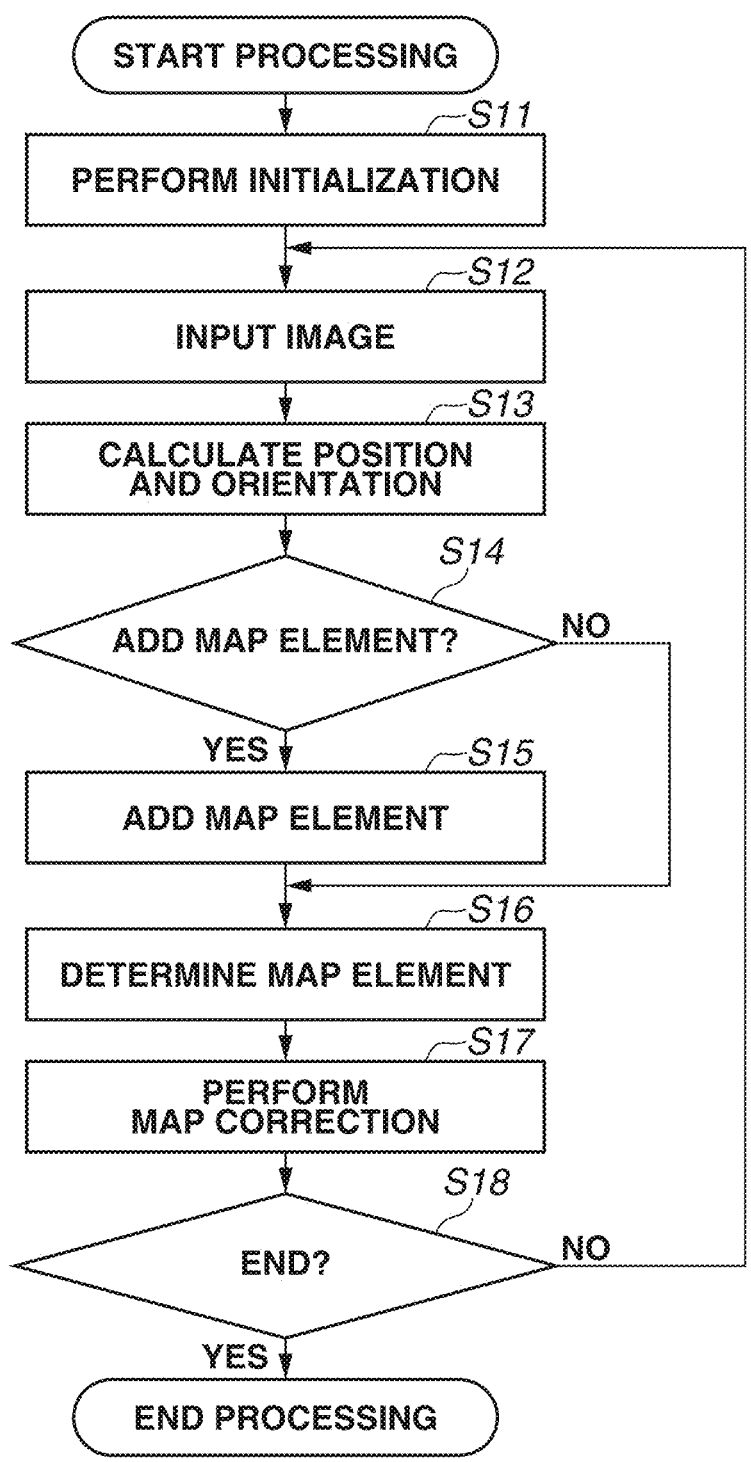
FIG. 4 is a flowchart illustrating a flow of processing to be performed by the information processing apparatus in the first exemplary embodiment.

FIG. 4 is a flowchart illustrating an operation of the information processing apparatus 100. In the following description, the flowchart of FIG. 4 is assumed to be implemented by the CPU H11 executing a control program. The processing illustrated in FIG. 4 starts in response to an instruction for starting a travel motion of the moving body being issued. Furthermore, while a case where all of the steps are performed within the information processing apparatus 100 is described, steps S11 to S15 can be performed by an apparatus outside of the information processing apparatus 100 and step S16 and subsequent steps can be performed by the information processing apparatus 100.

In step S11, the information processing apparatus 100 performs initialization of the system. Thus, the information processing apparatus 100 reads a program from the external memory H14 to bring the information processing apparatus 100 itself into an operable state. Moreover, as needed, the information processing apparatus 100 reads three-dimensional map information and camera parameters stored in the external memory H14 into the RAM H13.

In step S12, the input unit H15 receives, as an input, an image captured by the camera serving as the image capturing apparatus 10. The input unit H15 outputs the input image to the position and orientation estimation unit 12.

In step S13, the position and orientation estimation unit 12 performs matching concerning where in the image information input by the input unit 11 an image feature included in the three-dimensional map information stored in the map storing unit 110 exists. Then, the position and orientation estimation unit 12 calculates a position and orientation of the camera from a result of the matching. Upon completion of the calculation, the position and orientation estimation unit 12 advances the processing to step S14.

In step S14, the map element addition unit 13 determines the presence or absence of the necessity of addition of a map element. In the first exemplary embodiment, if the number of matchings between a feature point included in the three-dimensional map information and a feature point included in the image captured by the camera, which have matched each other in step S13, is less than or equal to a predetermined value, the map element addition unit 13 determines that addition of a map element is necessary (YES in step S14) and thus advances the processing to step S15. Moreover, if determining that addition of a map element is unnecessary (NO in step S14), the map element addition unit 13 advances the processing to step S16.

In step S15, the map element addition unit 13 generates a new keyframe, and adds the keyframe to the three-dimensional map information stored in the map storing unit 110. The map element addition unit 13 registers, with the new keyframe, for example, an ORB feature newly detected by the map element addition unit 13 together in addition to the position and orientation of the camera calculated by the position and orientation estimation unit 12 in step S13 and the matched feature points. Upon completion of the addition of a map element, the map element addition unit 13 advances the processing to step S16.

In step S16, the map element determination unit 111 determines a keyframe (map element) targeted for correction from keyframes included in the three-dimensional environment map information stored in the map storing unit 110. The method of determination and the number of selected keyframes are described below. The map element targeted for correction is part of three-dimensional map information. The map element determination unit 111 outputs the determined keyframe and three-dimensional position information about a feature point included in the determined keyframe to the map correction unit 112, and then advances the processing to step S17.

In step S17, the map correction unit 112 performs local bundle adjustment with the keyframe selected in step S16 set as an objective variable, thus correcting the keyframe position and orientation and the three-dimensional position of the feature point. Additionally, the map correction unit 112 updates the three-dimensional map information stored in the map storing unit 110 with the keyframe position and orientation and the three-dimensional position of the feature point, which have been corrected. Upon completion of the updating, the map correction unit 112 advances the processing to step S18.

In step S18, which is an end determination step, the information processing apparatus 100 determines whether to end the system. In the first exemplary embodiment, when the moving body (not illustrated) has arrived at a destination, a command for ending the system is input. If it is determined that the ending command is input (YES in step S18), the information processing apparatus 100 ends the system, and if not so (NO in step S18), the information processing apparatus 100 returns the processing to step S12, then continuing conversion of sensor information and map matching.

Figure 5:
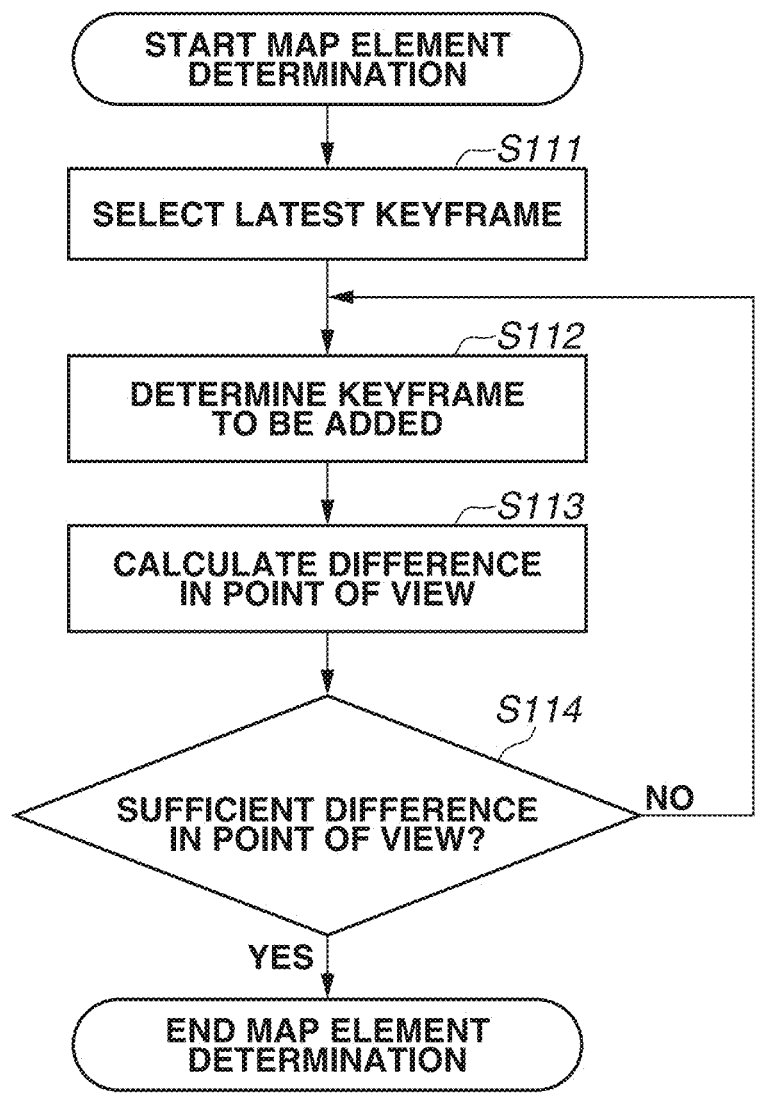
FIG. 5 is a flowchart illustrating details of map element selection processing in the first exemplary embodiment.

FIG. 5 is a flowchart illustrating detailed processing steps of step S16, which is a map element determination step which the map element determination unit 111 performs in the first exemplary embodiment. In the first exemplary embodiment, the map element determination unit 111 selects a keyframe which has been added last time and a keyframe including a feature point matching a feature point included in the former keyframe in such a manner that a difference in point of view between the frames becomes greater than or equal to a predetermined value. If the difference in point of view has become greater than or equal to the predetermined value, the reliability of a three-dimensional position of the three-dimensionally measured image feature becomes high. Specific steps are described as follows.

In step S111, the map element determination unit 111 selects the latest keyframe (a keyframe added last time) stored in the map storing unit 110. To enable selecting the latest keyframe, an identification (ID) which increments each time a keyframe is added or a clock time of registration of each keyframe is previously stored as ID information with respect to each keyframe. Upon selection of the latest keyframe, the map element determination unit 111 advances the processing to step S112.

In step S112, while targeting at not yet selected keyframes out of keyframes including feature points matching those of the latest keyframe, the map element determination unit 111 selects a keyframe including the largest number of feature points matching those of the latest keyframe. The map element determination unit 111 adds the selected keyframe to a list (not illustrated), and then advances the processing to step S113. Thus, keyframes targeted for correction are sequentially added to the list. Referring to FIG. 1C, since the latest keyframe at the right end and a keyframe second from the right end include the largest number of matched feature points, the keyframe second from the right end is selected and is added to the list. When step S112 has been performed again next, out of not yet selected keyframes, a keyframe third from the right end and the latest keyframe at the right end include the largest number of matched feature points. The keyframe third from the right end is selected and is added to the list. In the example illustrated in FIG. 1C, the loop processing in FIG. 5 is repeated, so that keyframes up to a keyframe fifth from the right end are selected as correction targets and are added to the list. If the camera moves linearly as illustrated in FIGS. 1A to 1C, since keyframes closer in registration clock time (keyframes adjacent each other in FIGS. 1A to 1C) are supposed to include more matched feature points, keyframes are sequentially added to the list in order from the right end. However, depending on a movement trajectory of the camera or the shape of the environment, feature points included in the frames closest in registration clock time to each other do not necessarily most match each other.

In step S113, the map element determination unit 111 calculates the maximum value of a difference in point of view with respect to each feature point included in the selected keyframe groups included in the list (not illustrated). Depending on a shape of the environment or a movement trajectory of the camera, a difference in point of view between keyframes at the right end and the left end of the keyframe group within the correction range (E009) selected as illustrated in FIG. 1C does not necessarily become maximum. A difference in point of view may become maximum in a combination of two keyframes included in the correction range (E009). The map element determination unit 111 calculates, as the maximum value of a difference in point of view, a Euclidean distance in two-dimensional coordinates on a keyframe image for each feature point. The map element determination unit 111 calculates the number of feature points in which the calculated maximum value of a difference in point of view for each feature point is greater than or equal to a previously defined predetermined value (for example, 10 pixels). Upon completion of the calculation, the map element determination unit 111 advances the processing to step S114.

In step S114, the map element determination unit 111 determines whether the number of feature points each having a difference in point of view greater than or equal to the predetermined threshold value calculated in step S113 is greater than or equal to a predetermined number (for example, 50 or more). If it is determined that the calculated number of feature points is greater than or equal to the predetermined number (YES in step S114), the map element determination unit 111 outputs the determined keyframes and three-dimensional positions of feature points included therein to the map correction unit 112, and then ends the map element determination step. If it is determined that the calculated number of feature points is less than the predetermined number (NO in step S114), the map element determination unit 111 returns the processing to step S112 and then continues selection of a keyframe. It being determined that the number of feature points each having a difference in point of view greater than or equal to a predetermined threshold value is greater than or equal to a predetermined number means it being determined that, if map correction processing is performed with use of a keyframe group included in the selected range, map correction processing is able to be performed with a high degree of accuracy. In step S114, as the reliability of three-dimensional position information of a feature point is lower, a larger number of keyframes (map elements) targeted for correction are selected, and, as the reliability of three-dimensional position information of a feature point is higher, a smaller number of keyframes (map elements) targeted for correction are selected.

Moreover, in step S113, even if the number of feature points each having a difference in point of view greater than or equal to the predetermined threshold value calculated in step S113 is neither greater than nor equal to the predetermined number, if the number of keyframes added in step S112 exceeds a predetermined number, the map element determination unit 111 ends the map element determination step. Then, in step S17, the map correction unit 112 performs map correction processing. This is performed to prevent the response performance of map correction processing from become deteriorated due to the correction range too broadening or the condition in step S114 not being satisfied. If map correction processing in step S17 is performed with a correction range including the selected keyframe group, the calculated camera position and orientation is able to be brought close to the real camera position and orientation even if not enough.

As described above, the first exemplary embodiment is configured to select a keyframe group in which a sufficient difference in point of view of an image feature is able to be obtained and performs map correction processing based on the selected keyframe group. With this configuration, for example, in the case of an environment where an image feature in which a difference in point of view is unlikely to be obtained, such as a far view, is dominant, causing a larger number of keyframes to be included in a correction range enables correcting a map with a high degree of accuracy in map correction processing. This also enables calculating, with a high degree of accuracy, three-dimensional coordinates of a feature point included in a map element and a position and orientation of the camera. If it is possible to generate a map with a high degree of accuracy, it becomes possible to perform position and orientation measurement with a higher degree of accuracy and it becomes possible to calculate a control value for controlling a moving body with a higher degree of accuracy. Moreover, in a case where a sufficient difference in point of view has been obtained, the first exemplary embodiment is configured to select a keyframe group including a smaller and minimum necessary number of keyframes and perform map correction processing based on the selected keyframe group. With this configuration, it becomes possible to correct a map in a shorter amount of time and with a smaller calculation resource.

<Modification Examples>

In the first exemplary embodiment, the information processing apparatus determines whether to select yet more keyframes based on the number of feature points in which the maximum value of a Euclid distance of a feature point position between keyframes selected for each feature point is greater than or equal to a predetermined value. The method of selecting a keyframe is not limited to the above-mentioned method, and a method of selecting a keyframe in such a manner that a difference in point of view of feature points included in the keyframe increases only needs to be employed. For example, the information processing apparatus can be configured to determine whether to select yet more keyframes based on whether the average value or median value of Euclid distances of a feature point position between keyframes is greater than or equal to a predetermined value.

While, in the first exemplary embodiment, the largeness or smallness of a difference in point of view is used as a benchmark for determining the number of map elements targeted for correction, the first exemplary embodiment is not limited to the use of the largeness or smallness of a difference in point of view as long as a benchmark enabling improving a position and orientation calculation accuracy is used. For example, if a depth value indicating a distance in the depth direction from the camera to a three-dimensional position of the feature point is used as a benchmark, the information processing apparatus can be configured to select more keyframes as the depth value is larger. Moreover, if the largeness or smallness of a residual difference at the time of correction is used as a benchmark, the information processing apparatus can be configured to select keyframes in such a manner that the residual difference becomes greater than or equal to a predetermined value. The information processing apparatus can use, as a benchmark, a reprojection error, which is a difference between a projection position obtained by projecting a three-dimensional position of a feature point on an image of a keyframe based on a position and orientation of the keyframe and coordinates of a feature point detected in the image. The information processing apparatus can be configured to select keyframes until the reprojection error reaches a predetermined number.

In the first exemplary embodiment, the map element determination unit 111 first selects the latest keyframe. Instead of the latest keyframe, the map element determination unit 111 can first select a nearest keyframe closest to the position and orientation calculated by the position and orientation estimation unit 12 or can first select a keyframe having the largest number of matchings with feature points in an image input by the input unit 11. The map element determination unit 111 can first select a keyframe having the greatest number of feature points in which a reprojection error is greater than or equal to a predetermined value out of frames included in map information.

If the number of times for which the map correction unit 112 performed correction for each keyframe is kept stored, the map element determination unit 111 can select a keyframe in which the number of times of correction is smallest. The map element determination unit 111 can select a keyframe in which the number of feature points each having a reprojection error greater than or equal to a predetermined value is largest out of keyframes in each of which the number of times of correction is less than or equal to a predetermined number. This results in selecting and correcting a low-accuracy keyframe for which correction has not been performed so much, so that it is possible to correct a map with a higher degree of accuracy.

As long as selecting a keyframe group in such a manner that features in common are included therein, the map element determination unit 111 can employ any selection method. For example, the map element determination unit 111 can select keyframes which are away from each other by a predetermined distance or more out of keyframes including features common to features included in the selected keyframe group or can select keyframes which are away from each other by the largest distance. This enables preferentially selecting keyframes which form a larger difference in point of view, so that it is possible to correct a map with a higher degree of accuracy.

Moreover, the map element determination unit 111 can define a variance of feature point detection positions on an image as a predetermined value, propagate the variance to a position and orientation of a keyframe to calculate a variance of positions and orientations of keyframes, and preferentially select keyframes in order from a keyframe having a larger variance of positions and orientations. Moreover, with respect to a map element in which an error has gone away as a result of correction, the map element determination unit 111 can exclude the map element from correction targets for subsequent correction. This enables reducing a calculation load.

The map element determination unit 111 determines a map element having a narrow range as a correction target and the map correction unit 112 performs map correction on the map element. Then, map correction can be performed over a plurality of times in such a manner that the map element determination unit 111 determines a map element having a broader range as a correction target and the map correction unit 112 performs map correction on the map element. In this way, first performing map correction locally and then performing map correction in a wider range enables correcting a map with a higher degree of accuracy.

In the first exemplary embodiment, the image capturing apparatus 10 is a monochrome camera. The image capturing apparatus 10 only needs to be a sensor capable of recording a real space as a two-dimensional array, such as a monochrome camera, a color camera, a stereoscopic camera, or a depth camera. The depth camera is a camera which acquires a depth map in which depth values obtained from the respective pixels of a sensor are stored.

Moreover, the image capturing apparatus 10 only needs to be configured to be able to acquire the structure or shape of a surrounding environment, and can be configured to use LiDAR (an acronym of "light detection and ranging"). In the case of using LiDAR, a point group sequence acquired by one scan is regarded as image information. In the case of using LiDAR, a map element is stored as a point cloud of three-dimensional point group, and the map element determination unit 111 is configured to select a subset of the point cloud.

In the first exemplary embodiment, three-dimensional map information is data in which three-dimensional position information about a keyframe and a feature point is stored. While the first exemplary embodiment uses, for example, the method by Raul et al. for position and orientation calculation and map correction, the first exemplary embodiment can use a method other than the method by Raul et al. as long as the method is a method of generating a three-dimensional map and performing position and orientation calculation with use of an input image obtained by the camera and then performing map correction.

The data structure of a map element of three-dimensional map information does not need to be the above-mentioned keyframe as long as it is a map element available to store a three-dimensional position representing a real space and location information about a feature point acquired from image information captured by the camera and calculate a position and orientation of the camera. A feature representing the position of a three-dimensional space can be normal point data (NP) not only storing three-dimensional coordinates of a point, such as a feature point, but also having a normal, or can be a signed distance function (SDF) or a truncated signed distance function (TSDF) representing a boundary position relative to an object included in a space. The feature can be a three-dimensional line segment. Moreover, the feature point is not limited to a feature point described in the first exemplary embodiment, but can be an edge or can be distribution information about light and dark or a depth map in which depth values are stored in respective pixels of an image. Even in the case of using such a map element, the map element determination unit 111 can select a map element in which normals disagree with each other in such a manner that a variance of three-dimensional coordinates or camera positions and orientations decreases. Specifically, in a case where the map storing unit 110 has NP or TSDF, the map element determination unit 111 selects a map element in which normals disagree with each other in such a manner that the angle of a normal of the camera used to observe an element of NP or TSDF of a target becomes larger than a predetermined angle.

In the first exemplary embodiment, the map correction unit 112 performs correction in such a manner that a geometric positional relationship between map elements determined by the map element determination unit 111 becomes more highly accurate. As described in the first exemplary embodiment, the map correction unit 112 can perform correction with use of bundle adjustment in such a manner that a reprojection error decreases. The map correction unit 112 can perform correction with use of pose graph optimization in such a manner that the sum of errors of relative position and orientation between keyframes decreases. In a case where the image capturing apparatus uses a depth camera or LiDAR, the map correction unit 112 can perform correction with use of an iterative closest point (ICP) algorithm in such a manner that the distance between the measured three-dimensional point group and a three-dimensional point group included in a map is minimized. In this way, the map correction unit 112 uses a correction method in which a geometric error of a map element decreases.

While, in the first exemplary embodiment, a method in which the position and orientation calculated by the position and orientation estimation unit 12 is used to control a moving body has been described, the first exemplary embodiment can be applied to another type of apparatus using a position and orientation. For example, the first exemplary embodiment can be applied to a position and orientation estimation apparatus for presenting a virtual object in combination with a real image as in mixed reality (MR) or augmented reality (AR) or can be applied to an apparatus which inputs a current position and orientation in virtual reality (VR) moving in a virtual space based on a position and orientation in a real space. The information processing apparatus in the first exemplary embodiment can be used as a configuration for measuring the front edge location of a robot hand, and a system using the calculated position and orientation is optional.

In the first exemplary embodiment, a system configuration of the moving body 1 has been described. The information processing apparatus 100 includes at least the map element determination unit 111 and the map correction unit 112. The map storing unit 110 is included, as a buffer, in the information processing apparatus 100, and three-dimensional map information can be kept stored in an external server. As needed, the information processing apparatus 100 can acquire part of three-dimensional map information from an external server and download the part of three-dimensional map information to the map storing unit 110, thus performing map correction processing. Additionally, a map management server in a moving body can keep a map received from the moving body stored, and can select a part of the map to perform local correction. Moreover, a configuration of the information processing apparatus 100 can be included in an external server connected to a moving body via a network, and the moving body can be controlled with use of a three-dimensional map corrected by the information processing apparatus 100 on the server.

Map correction processing in the first exemplary embodiment can be performed in a map correction thread described below in a second exemplary embodiment. Alternatively, if information about a map element targeted for correction is copied, correction processing can be performed in a thread which is waiting for processing in a CPU of the information processing apparatus 100, and a result of the correction processing can be output to the map storing unit 110. Additionally, correction processing can be performed not only by the information processing apparatus 100 but also by an external computer. Alternatively, in an environment in which a plurality of moving bodies simultaneously move, a calculation resource of another moving body which is small in processing load can be used. Moreover, correction processing can be performed with use of a waiting time in which a map optimization thread which performs loop closing processing described in the method by Raul et al. is not performing optimization calculation.

In the first exemplary embodiment, the largeness or smallness of a difference in point of view is used as a benchmark for determining the number of map elements targeted for correction. In a second exemplary embodiment, a method of selecting a smaller number of map elements targeted for correction in a case where an expected processing load is high and selecting a larger number of map elements targeted for correction in a case where an expected processing load is low is described.

In the second exemplary embodiment, a computer in which two CPUs each corresponding to the CPU H11 illustrated in FIG. 3 are mounted is assumed to be used as an information processing apparatus. The information processing apparatus allocates two threads, i.e., a position and orientation calculation thread for calculating a position and orientation each time an image is input and a map correction thread for adding a map, to the respective CPUs to execute the two threads. Furthermore, the position and orientation calculation thread is configured to, in addition to calculating a position and orientation, request the map correction thread to add a map in a case where a movement by a predetermined distance occurs after the position and orientation calculation thread requests addition of a keyframe last time (hereinafter, the predetermined distance being referred to as a "keyframe addition interval distance"). The map correction thread performs addition processing of a map according to a request for addition of a map. Map correction processing in the second exemplary embodiment is configured to be performed in an interval of map addition processing in the latter map correction thread.

Figure 6:
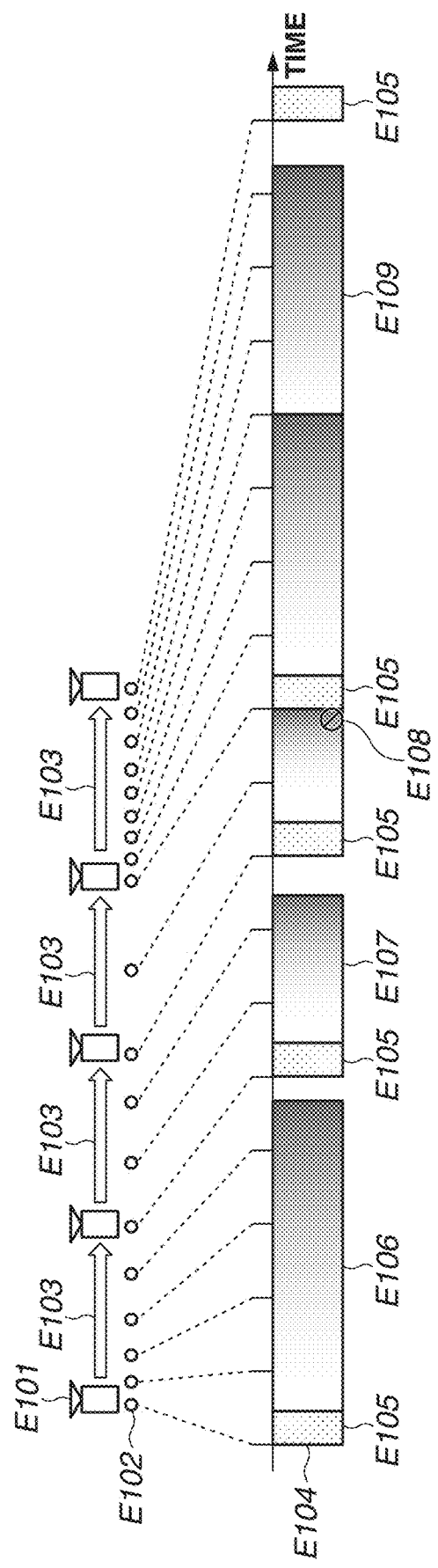
FIG. 6 is a diagram illustrating a concept of processing in a second exemplary embodiment.

FIG. 6 is a diagram used to explain a conception of timing of processing which the map correction thread performs. A camera position E101 is gradually moving to the right.

Moreover, each time the camera position E101 moves by a predetermined distance, addition of a map element, i.e., addition of a keyframe, is performed. Image capturing timing E102 is timing at which the camera performs image capturing to acquire an image. For example, in a case where image capturing is performed at 60 hertz (Hz), the image capturing timing E102 has an interval of 16.66 milliseconds (ms). A movement speed E103 indicates that a wider arrow represents a higher movement speed. A timing diagram E104 represents timing of processing which the map correction thread performs. Timing E105 represents timing of addition processing of a keyframe. An interval between timings E105 is a processing time from when the map correction thread has completed addition of a keyframe to when the map correction thread starts addition of a next keyframe. Hereinafter, this processing time is referred to as an "interval time". The second exemplary embodiment is configured to predict an interval time, select the number of map elements coordinating with the interval time (E106 to E109), and perform map correction processing.

In the second exemplary embodiment, the information processing apparatus predicts an interval time based on a movement speed of the camera calculated from a difference in position and orientation calculated in a time-series manner. In a case where the movement speed of the camera is low, the information processing apparatus selects more map elements and performs map correction while taking more time (E106). On the other hand, in a case where the camera moves quickly, the information processing apparatus selects a few map elements and performs map correction in a shorter amount of time (E107). Moreover, in a case where map addition processing has interposed on the way (E108), the information processing apparatus interrupts the map correction processing and preferentially performs the map addition processing. Moreover, if there is an interval time further left in a case where the map correction processing has been completed, the information processing apparatus iteratively performs map correction processing (E109). Furthermore, a relationship between the number of map elements and a time for correction processing is obtained in advance as a correspondence relationship. The information processing apparatus selects map elements the number of which coordinates with an interval time based on the previously obtained relationship.

The configuration of the information processing apparatus in the second exemplary embodiment is the same as the configuration of the information processing apparatus 100 described in the first exemplary embodiment and illustrated in FIG. 2 and FIG. 4, and is, therefore, omitted from description. A difference from the first exemplary embodiment is a determination step in which the map element determination unit 111 determines a map element targeted for correction.

A procedure of the whole processing in the second exemplary embodiment is the same as that illustrated in FIG. 4, which illustrates a processing procedure by the information processing apparatus 100 described in the first exemplary embodiment, and is, therefore, omitted from description. A difference from the first exemplary embodiment is the processing details of step S16, in which the map element determination unit 111 determines a map element targeted for correction, and step S17, in which the map correction unit 112 performs map correction processing.

In step S16, the map element determination unit 111 determines a map element targeted for correction.

First, the map element determination unit 111 predicts an interval time of the map correction thread based on a movement speed of the camera obtained from the position of the camera calculated by the position and orientation estimation unit 12 in a time-series manner. Specifically, the map element determination unit 111 calculates a speed of the camera by dividing a difference between positions of the camera calculated by the position and orientation estimation unit 12 at two time points by a time between the two time points. Next, the map element determination unit 111 predicts a time until addition of a next keyframe is requested, i.e., an interval time, by dividing the keyframe addition interval distance by the speed of the camera.

Next, the map element determination unit 111 predicts the number of keyframes falling within the predicted interval time. The map element determination unit 111 determines the maximum number of keyframes falling within the predicted interval time based the previously obtained relationship between the number of keyframes and a time required for correction processing. With regard to selection of map elements, as described in the first exemplary embodiment, the map element determination unit 111 selects a number of keyframes falling within the predicted interval time in order from a keyframe having a larger number of feature points in common out of keyframes having feature points in common with the latest keyframe.

Then, the map element determination unit 111 outputs the selected keyframes to the map correction unit 112, and then advances the processing to step S17.

In step S17, the map correction unit 112 performs correction processing of three-dimensional map information. In the present step, the map correction unit 112 performs, in addition to processing described in step S17 in the first exemplary embodiment, discontinuation of processing. Thus, in a case where the position and orientation calculation thread has requested addition of a keyframe while the map correction unit 112 is performing map correction processing, the map correction unit 112 stops map correction processing and then performs keyframe addition processing.

As described above, in the second exemplary embodiment, the information processing apparatus selects and corrects the maximum number of processible keyframes at an interval time of map addition processing. In this way, the information processing apparatus corrects a map with a higher degree of accuracy without increasing apparent processing cost in position and orientation calculation or map addition. Moreover, in a case where a request for map addition processing has been received during map correction processing, the information processing apparatus stops map correction processing, thus calculating a position and orientation of the camera without any conventional influence on position and orientation calculation or map addition processing. This enables performing position and orientation measurement with a higher degree of accuracy and thus enables calculating a control value for controlling a moving body with a high degree of accuracy.

<Modification Examples>

In the second exemplary embodiment, the information processing apparatus performs correction processing on the maximum number of keyframes able to be processed for correction in the predicted interval time of map addition processing. As long as able to improve a map accuracy, the information processing apparatus is not limited to processing the maximum number of keyframes able to be processed in an interval time. The information processing apparatus can select keyframes the number of which is smaller by a predetermined number than a predicted number in such a way as to prevent discontinuation of processing from occurring, or can select a number of keyframes falling within an interval time available for obtaining a predetermined difference in point of view in combination with the first exemplary embodiment. The information processing apparatus can perform map correction processing in an interval time not only once but also twice, thrice, and subsequent times between map addition processing operations. When performing such processing a larger number of times, the information processing apparatus is able to correct a map with a high degree of accuracy.

Instead of calculating an interval time each time, the information processing apparatus can previously obtain an average value of interval times or an expected time, previously determine a predetermined number of keyframes falling within the average value or expected time, select the determined number of keyframes, and then perform correction processing.

In the second exemplary embodiment, the information processing apparatus predicts an interval time and selects the number of keyframes to be dynamically selected, but only needs to be configured to select more keyframes in a case where there is room for processing.

For example, the information processing apparatus can select keyframes the number of which is inversely proportional to a movement speed of the camera, or can select keyframes the number of which is inversely proportional to a usage rate of the CPU (H11).

While, in the second exemplary embodiment, the information processing apparatus is configured to perform map correction processing separately from map addition processing, the second exemplary embodiment can be applied to the map addition processing itself. Specifically, the second exemplary embodiment can be applied to local bundle adjustment in map addition processing described in the method by Raul et al., so that the information processing apparatus can be configured to vary the number of keyframes to be dynamically corrected and add or correct a map.

In the second exemplary embodiment, the map element determination unit determines the number of keyframes as the number of map elements. The information processing apparatus is not limited to determining the number of keyframes, but only needs to vary the number of map elements or a processing time in map correction processing and can individually vary the number of feature points, the number of camera positions and orientations, or the number of three-dimensional positions of feature points.

While, in the second exemplary embodiment, a configuration in which two CPUs (H11) are mounted and are respectively allocated to position and orientation calculation and map addition processing has been described, the number of CPUs is optional as long as the present function is able to be implemented. The number of CPUs can be one at minimum or can be three or more.

A configuration including a graphical user interface (GUI) for making the processing details of the information processing apparatus visible and allowing inputting of parameters required for processing is described. Specifically, the information processing apparatus displays, on a display unit (not illustrated), a map element determined by the map element determination unit 111 and timing of processing performed by the map correction unit 112. Moreover, the information processing apparatus receives, as inputs, setting parameters, such as a threshold value for a difference in point of view and a threshold value for a distance between the camera and a three-dimensional position of an image feature, described in the first exemplary embodiment.

Figure 7:
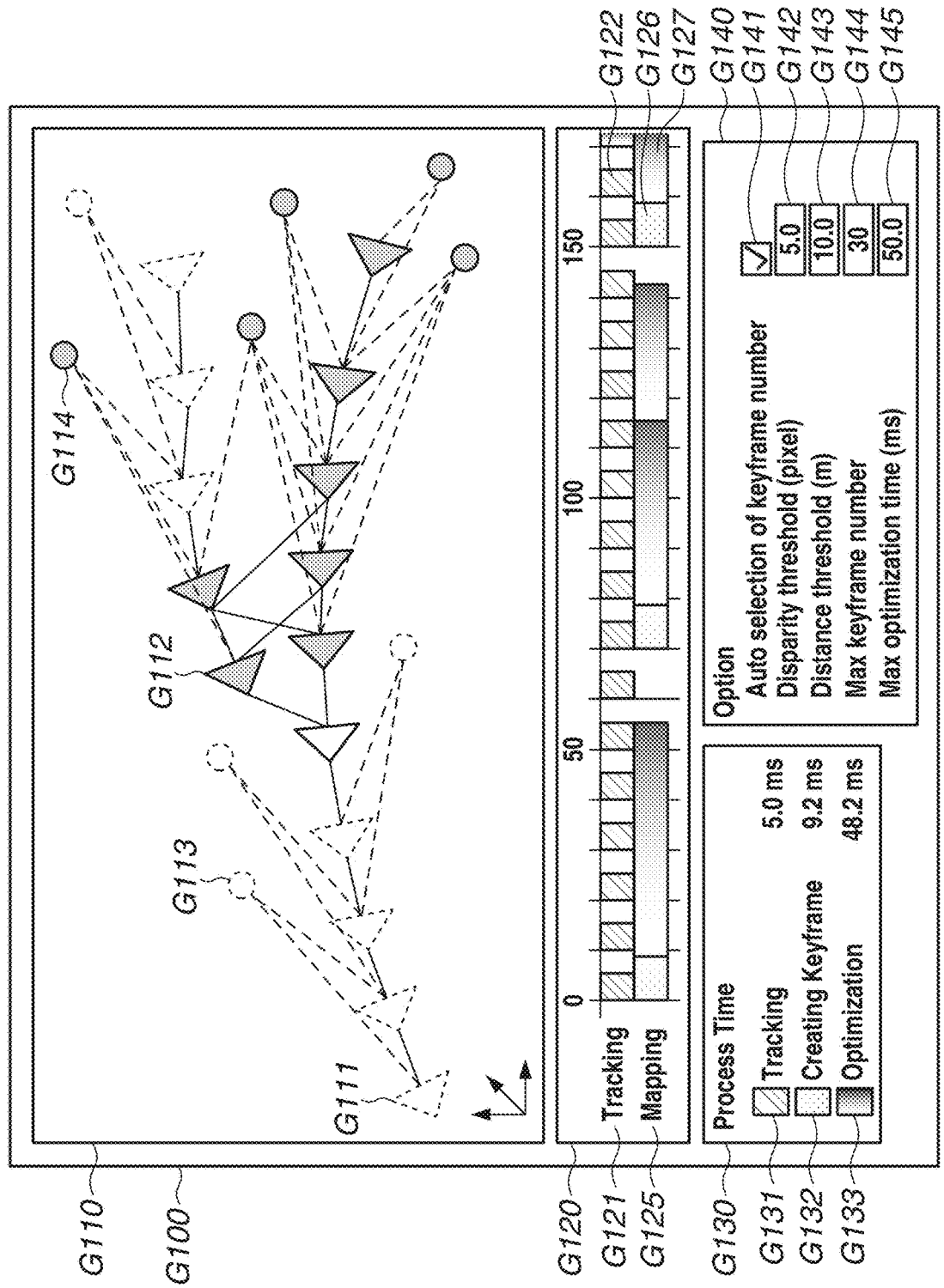
FIG. 7 is a diagram illustrating an example of a graphical user interface (GUI) for setting parameters concerning selection of a map element, which presents a map element selection or map correction processing result.

A processing step for displaying a map element determined by the map element determination unit 111 and processing timing of map correction processing to be performed by the map correction unit 112 and receiving various parameters as inputs from the user is described. FIG. 7 illustrates an example of a GUI G100, which implements such a processing step with use of a touch panel display including the input unit H15 and the display unit H16.

A window G110 displays a map element determined by the map element determination unit 111.

The window G110 is displaying a triangle (G112) filled in grey representing a position and orientation of a keyframe and a spherical shape (G114) filled in grey representing a three-dimensional position of an image feature, which are map elements selected. On the other hand, the window G110 is displaying an unfilled triangle (G111) representing a position and orientation of a keyframe and an unfilled spherical shape (G113) representing a three-dimensional position of an image feature, which are map elements not selected. Performing displaying in such a manner enables the user to readily understand which map elements have been used for correction.

A window G120 indicates timing of processing which two CPUs (H11) described in the second exemplary embodiment have performed. In an indicator G121, a time for which the CPUs have been used for position and orientation calculation each time image information is input to the position and orientation estimation unit 12 in the position and orientation calculation thread is represented by a quadrangle (G122) filled with oblique lines. In an indicator G125, a time for which the map element addition unit 13 has used the CPUs for addition of a map in the map correction thread is represented by a quadrangle (G126) filled with dots. Moreover, a time for which the CPUs have been used for the map element determination unit 111 to determine a map element and for the map correction unit 112 to perform map correction is represented by a quadrangle (G127) filled with gradation. Performing displaying in such a manner enables the user to readily understand to what degree each type of processing has used a calculation resource and at what timing each type of processing has been performed. Moreover, performing displaying in such a manner enables the user to understand whether map correction processing has been performed.

A window G130 indicates various processing times. The window G130 is displaying a processing time (G131) taken for position and orientation calculation, a processing time (G132) taken for map addition, and a processing time (G133) taken for correction of a map. Performing displaying in such a manner enables the user to understand actually at what degree of calculation cost each type of processing has been performed. Moreover, performing displaying in such a manner also enables the user to understand a time taken for correction of a map.

A window G140 is a GUI window used to set various parameters. A checkbox G141 is used to set whether to drive map correction processing for dynamically selecting a map element. The map correction processing is enabled in response to the checkbox G141 being checked. Input forms G142 and G143 are used to input a threshold value for a difference in point of view and a threshold value for a distance between the camera and three-dimensional coordinates of an image feature, respectively, for determining the number of keyframes to be selected, described in the first exemplary embodiment. Moreover, input forms G144 and G145 are used to set an upper limit of the number of keyframes to be determined by the map element determination unit 111 and an upper limit of the processing time required for the map correction unit 112 to perform correction, respectively. Setting values are reflected in response to numerical values being input from an input unit such as a keyboard. To correct map information with a higher degree of accuracy, an adjustment operation for making parameters for the input forms G142 and G144 larger can be performed, and, to reduce a calculation amount, an adjustment operation for making parameters for the input forms G144 and G145 smaller can be performed. Employing such a GUI enables the user to change parameters in conformity with a usage situation or adjust a behavior of the information processing apparatus 100.

Displaying a map element which the map element determination unit determines and a processing time which is required for the map correction unit enables the user to readily understand a map correction situation. Additionally, allowing the user to input setting parameters enables the user to adjust a behavior of the information processing apparatus in such a way as to correct a map with a high degree of accuracy and at low cost as desired by the user. This enables calculating a position and orientation with a higher degree of accuracy and at lower cost to control a moving body.

<Modification Examples>

In the second exemplary embodiment, five parameters shown in the window G140 are configured to be changeable by the user. Parameters to be input by the user are not limited to the above-mentioned parameters, and can be any parameters as long as those are used to change a range of map elements to be determined by the map element determination unit 111 or to change a processing time required for the map correction unit 112. For example, various number parameters can be configured to be input in such a way as to select keyframes and feature points the number of which is designated by the user and perform map correction.

The contents to be displayed by the GUI G100 in the second exemplary embodiment are not limited to the contents shown in the windows G110, G120, and G130, and only need to be contents used to present, to the user, a map element to be determined by the map element determination unit 111 and information concerning correction processing to be performed by the map correction unit 112. For example, to enable the user to intuitively understand in what region included in map information a map element determined by the map element determination unit 111 is, first, the entire map information can be presented to the user and a rectangle surrounding a region including the map element determined by the map element determination unit 111 can be depicted. To enable the user to understand whether map correction has already been completed, the color of displaying can be changed in conformity with the number of times of map correction and the changed color can be presented to the user. The processing time can be displayed not as a numerical value but as a graph.

The operation method for the GUI in the second exemplary embodiment is not limited to a checkbox or inputting of a numerical value such as those shown in the window G140. Optional units such as a slide bar and a radio button can be used as long as those are configured to allow inputting of setting parameters.

In the second exemplary embodiment, a touch panel display is used for the input unit H15 and the display unit H16. The input unit H15 and the display unit H16 only need to be a method of allowing inputting of common parameters or information available for generating common parameters, and a mouse or a keyboard can be used for the input unit H15.

The display unit H16 can be a display device such as a liquid crystal display or a 7-segment light-emitting diode (LED).

Instead of a slide bar or inputting of a numerical value described in the second exemplary embodiment, a configuration of presenting candidates on a screen and allowing selection can be employed.

In the first exemplary embodiment, a correction method of making the maximum value of a difference in point of view on an image included in a map element group targeted for correction greater than or equal to a predetermined value by making the number of map elements targeted for correction larger than a previously determined fixed number has been described. On the other hand, in a third exemplary embodiment, a correction method of making the maximum value of a difference in point of view on an image included in a map element group targeted for correction greater than or equal to a predetermined value by enlarging an interval between map elements targeted for correction is described.

A functional configuration in the third exemplary embodiment is the same as that of the information processing apparatus 100 described in the first exemplary embodiment.

A flowchart of the processing procedure in the third exemplary embodiment is the same as the flowchart of FIG. 4 described in the first exemplary embodiment, and is, therefore, omitted from description. Here, the description of steps identical to those in the first exemplary embodiment is omitted, and a processing procedure different from that in the first exemplary embodiment is described.

In the third exemplary embodiment, in processing for map element selection in step S16, first, the information processing apparatus selects map elements serving as a maximum difference in point of view out of map elements each including a predetermined number or more of features in common to the map element selected in step S111. Next, the information processing apparatus selects map elements between the already selected map elements at regular intervals in such a way as to prevent the number of map elements targeted for correction from exceeding a previously determined fixed number.

Using the method in the third exemplary embodiment enables generating a high-accuracy map in the case of an environment in which an image feature unlikely to be available for obtaining a difference in point of view, such as a far view, is dominant, and enables performing high-accuracy position and orientation measurement. Moreover, performing selection in such a way as to prevent the number of map elements targeted for correction from exceeding a previously determined fixed number enables reducing a calculation load for correction processing.

<Modification Examples>

While, in the third exemplary embodiment, first, the information processing apparatus selects map elements serving as the maximum difference in point of view, the method of selecting map elements can be any other method as long as a difference in point of view becomes greater than or equal to a predetermined value. For example, the information processing apparatus can select map elements at random out of map elements in which a difference in point of view becomes greater than or equal to a predetermined value, or can select a map element in which the number of feature points in common to the map element selected in step S111 is maximum.

Moreover, while, in the third exemplary embodiment, a method of selecting map elements at regular intervals has been described, the third exemplary embodiment is not necessarily limited to selecting map elements at regular intervals as long as a method of preventing the number of map elements from exceeding a previously determined fixed number is used. For example, the information processing apparatus can preferentially select a map element having a large variance of positions and orientations calculated by the method described in the first exemplary embodiment, or can calculate a degree of similarity by calculating the ratio of the number of feature points included in common to the number of feature points included in the respective map elements and preferentially select a map element having a lower degree of similarity.

Moreover, while, in the third exemplary embodiment, the information processing apparatus performs selection in such a way as to prevent the number of map elements targeted for correction from exceeding a fixed number, in a case where a load on the information processing apparatus is high, the number can be decreased, and, in a case where a load on the information processing apparatus is low, the number can be increased.

In a fourth exemplary embodiment, a method of enlarging a difference in point of view of map elements targeted for correction by adaptively changing an interval for adding map elements according to a distance between feature points is described.

In the fourth exemplary embodiment, the information processing apparatus enlarges an addition interval for map elements in a case where features included in map elements are away from each other by a predetermined distance or more.

A functional configuration in the fourth exemplary embodiment differs from the first exemplary embodiment in that a map element addition unit 13 is added to the information processing apparatus 100 described in the first exemplary embodiment.

A flowchart of the processing procedure in the fourth exemplary embodiment is the same as the flowchart of FIG. 4 described in the first exemplary embodiment, and is, therefore, omitted from description. Here, the description of steps identical to those in the first exemplary embodiment is omitted, and a processing procedure different from that in the first exemplary embodiment is described.

When determining whether to add a map element in the processing in step S14, the information processing apparatus determines a map element addition interval by setting the addition interval larger as the magnitude of an average value of depth values, each of which is a distance in the depth direction from the image capturing apparatus to a three-dimensional position of an image feature included in the map element, is larger.

Using the method in the fourth exemplary embodiment enables generating a high-accuracy map in the case of an environment in which an image feature unlikely to be available for obtaining a difference in point of view is dominant, and enables performing high-accuracy position and orientation measurement. Moreover, enlarging the map element addition interval leads to a reduction in memory of the map storing unit and also leads to making calculation more efficient.

<Modification Examples>

While, in the fourth exemplary embodiment, an addition interval is determined according to the magnitude of an average value of depth values, the fourth exemplary embodiment is not limited to this, as long as a method of dynamically changing an addition interval for map elements and enlarging a difference in point of view of a map element targeted for correction is used. While, in the fourth exemplary embodiment, an addition interval is set larger as an average value of depth values is larger, an addition interval can be set larger as not an average value but a median value is larger. Moreover, an addition interval can be enlarged as a variance of positions and orientations or three-dimensional position information is larger, or an addition interval can be enlarged as an average value or median value of reciprocals of the magnitude of a difference in point of view of a feature included in a map element is larger. Moreover, a method of previously storing a plurality of addition intervals and switching the addition interval to one of the previously stored addition intervals according to the magnitude of an average value of depth values, the magnitude of a variance of positions and orientations, or the magnitude of an average value or median value of reciprocals of the magnitude of a difference in point of view of a feature, which have been mentioned above, can be employed.

Aspects of some embodiments can also be implemented by performing the following processing. Thus, the processing includes supplying software (program) for implementing functions of the above-described exemplary embodiments to a system or apparatus via a network or any type of storage medium, and causing a computer (or a CPU or micro processing unit (MPU)) of the system or apparatus to read out and execute the program. Moreover, the processing can include recording the program on a computer-readable recording medium and supplying the computer-readable recording medium.

According to aspects of some embodiments, it is possible to correct, with a high degree of accuracy, a map in an environment in which a moving body moves.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-037805, which was filed on Mar. 9, 2021, and Japanese Patent Application No. 2022-005838, which was filed on Jan. 18, 2022, both of which are hereby incorporated by reference herein in their entireties.

What is claimed is:

1. An information processing apparatus comprising:
   a first generation unit configured to generate a map element that is based on a position and orientation of an image capturing apparatus estimated from an image obtained by performing image capturing of an environment with the image capturing apparatus being mounted on a moving body and three-dimensional position information in the environment about a feature point included in the image;
   a second generation unit configured to generate three-dimensional map information based on a plurality of map elements, each corresponding to the map element, generated from images having a difference in point of view captured by the image capturing apparatus at a plurality of different positions and orientations;
   a first correction unit configured to, in such a way as to make smaller a reprojection error of a common feature point included in common in a first map element group out of the three-dimensional map information, correct at least one of a position and orientation of the image capturing apparatus and three-dimensional position information about the feature point included in the first map element group; and
   a second correction unit configured to, in such a way as to make smaller a reprojection error of the common feature point with use of a second map element group in which a wider difference in point of view is obtained than in the first map element group with respect to the common feature point in a case where a difference in point of view of images including the common feature point is less than or equal to a predetermined value, correct at least one of a position and orientation of the image capturing apparatus and three-dimensional position information about the feature point included in the second map element group.

2. The information processing apparatus according to claim 1, wherein the first correction unit corrects at least one of a position and orientation of the image capturing apparatus and the three-dimensional position information, which are included in the three-dimensional map information, in such a way as to make smaller a difference in distance between a position on which the three-dimensional position information included in the first map element group is projected based on a position and orientation of the image capturing apparatus included in the first map element group and a position of the feature point in the image.

3. The information processing apparatus according to claim 2, wherein the second correction unit calculates at least one of a variance of positions and orientations of the image capturing apparatus and a variance of the three-dimensional position information based on a difference in point of view of the feature points included in the second map element group.

4. The information processing apparatus according to claim 1, wherein the second correction unit uses, as the second map element group, a map element group in which, as a variance of positions and orientations of the image capturing apparatus or the three-dimensional position information becomes larger, a wider difference in point of view is obtained.

5. The information processing apparatus according to claim 4, wherein the second correction unit calculates at least one of a variance of positions and orientations of the image capturing apparatus and a variance of the three-dimensional position information based on a distance between a position of the image capturing apparatus and a position indicated by the three-dimensional position information included in the second map element group.

6. The information processing apparatus according to claim 1, wherein the second correction unit uses, as the second map element group, a map element group in which, as a processing load on the information processing apparatus is lower, a wider difference in point of view is obtained.

7. The information processing apparatus according to claim 1, further comprising:
   an input unit configured to input an image captured by the image capturing apparatus; and
   a position and orientation estimation unit configured to calculate a position and orientation of the image capturing apparatus based on a feature point detected from an image input by the input unit and the three-dimensional map information.

8. The information processing apparatus according to claim 7,
   wherein the position and orientation estimation unit further calculates a movement speed of the image capturing apparatus, and
   wherein the second correction unit determines more map elements as correction targets as the movement speed of the image capturing apparatus is lower.

9. The information processing apparatus according to claim 8, further comprising a map element addition unit configured to add, to the three-dimensional map information, a position and orientation estimated by the position and orientation estimation unit and a feature point detected from an image input by the input unit.

10. The information processing apparatus according to claim 9, wherein the second correction unit determines more map elements as correction targets as a time of interval from when the map element addition unit adds a map element to when the map element addition unit adds a next map element becomes longer.

11. The information processing apparatus according to claim 9, further comprising a map element interval determination unit configured to determine an addition interval of map elements at which the map element addition unit adds a map element.

12. The information processing apparatus according to claim 11, wherein the map element interval determination unit enlarges the addition interval of map elements in such a manner that the difference in point of view becomes greater than or equal to a predetermined value.

13. The information processing apparatus according to claim 11, wherein the map element interval determination unit enlarges the addition interval of map elements as a variance of positions and orientations of the image capturing apparatus and a variance of the three-dimensional position information become larger.

14. The information processing apparatus according to claim 11, wherein the map element interval determination unit enlarges the addition interval of map elements based on a distance in a depth direction from the image capturing apparatus to a three-dimensional position of the feature point.

15. The information processing apparatus according to claim 14, wherein the map element interval determination unit enlarges the addition interval of map elements as an average value or median value of distances in the depth direction from the image capturing apparatus to a three-dimensional position of the feature point.

16. The information processing apparatus according to claim 7, further comprising a control unit configured to calculate a control value for controlling the moving body based on the position and orientation estimated by the position and orientation estimation unit.

17. An information processing method comprising:
generating a map element that is based on a position and orientation of an image capturing apparatus estimated from an image obtained by performing image capturing of an environment with the image capturing apparatus being mounted on a moving body and three-dimensional position information in the environment about a feature point included in the image;
generating three-dimensional map information based on a plurality of map elements, each corresponding to the map element, generated from images having a difference in point of view captured by the image capturing apparatus at a plurality of different positions and orientations;
correcting, in such a way as to make smaller a reprojection error of a common feature point included in common in a first map element group out of the three-dimensional map information, at least one of a position and orientation of the image capturing apparatus and three-dimensional position information about the feature point included in the first map element group; and
correcting, in such a way as to make smaller a reprojection error of the common feature point with use of a second map element group in which a wider difference in point of view is obtained than in the first map element group with respect to the common feature point in a case where a difference in point of view of images including the common feature point is less than or equal to a predetermined value, at least one of a position and orientation of the image capturing apparatus and three-dimensional position information about the feature point included in the second map element group.

18. A non-transitory computer-readable storage medium storing computer-executable instructions that, when executed by a computer, cause the computer to perform an information processing method comprising:
generating a map element that is based on a position and orientation of an image capturing apparatus estimated from an image obtained by performing image capturing of an environment with the image capturing apparatus being mounted on a moving body and three-dimensional position information in the environment about a feature point included in the image;
generating three-dimensional map information based on a plurality of map elements, each corresponding to the map element, generated from images having a difference in point of view captured by the image capturing apparatus at a plurality of different positions and orientations;
correcting, in such a way as to make smaller a reprojection error of a common feature point included in common in a first map element group out of the three-dimensional map information, at least one of a position and orientation of the image capturing apparatus group and three-dimensional position information about the feature point included in the first map element; and
correcting, in such a way as to make smaller a reprojection error of the common feature point with use of a second map element group in which a wider difference in point of view is obtained than in the first map element group with respect to the common feature point in a case where a difference in point of view of images including the common feature point is less than or equal to a predetermined value, at least one of a position and orientation of the image capturing apparatus and three-dimensional position information about the feature point included in the second map element group.

* * * * *